Figure 4:
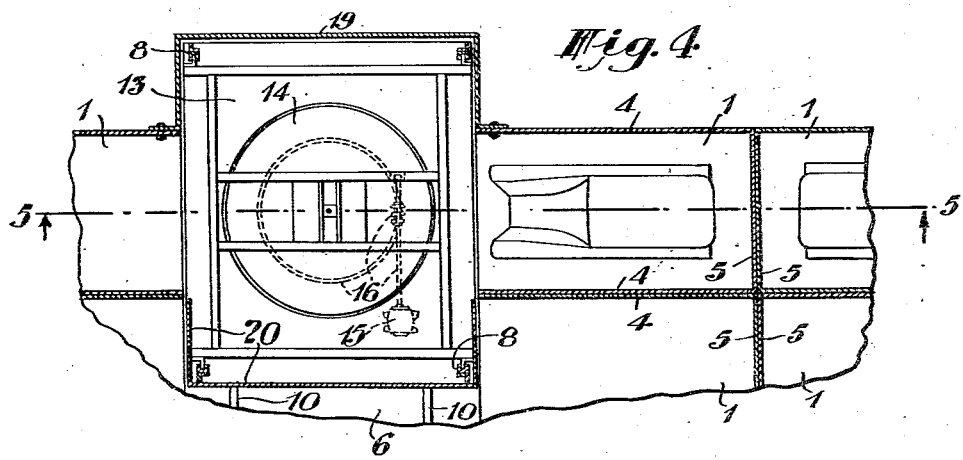

Nov. 8, 1932.  F. E. D'HUMY  1,886,943
GARAGE
Filed March 21, 1930  2 Sheets-Sheet 1
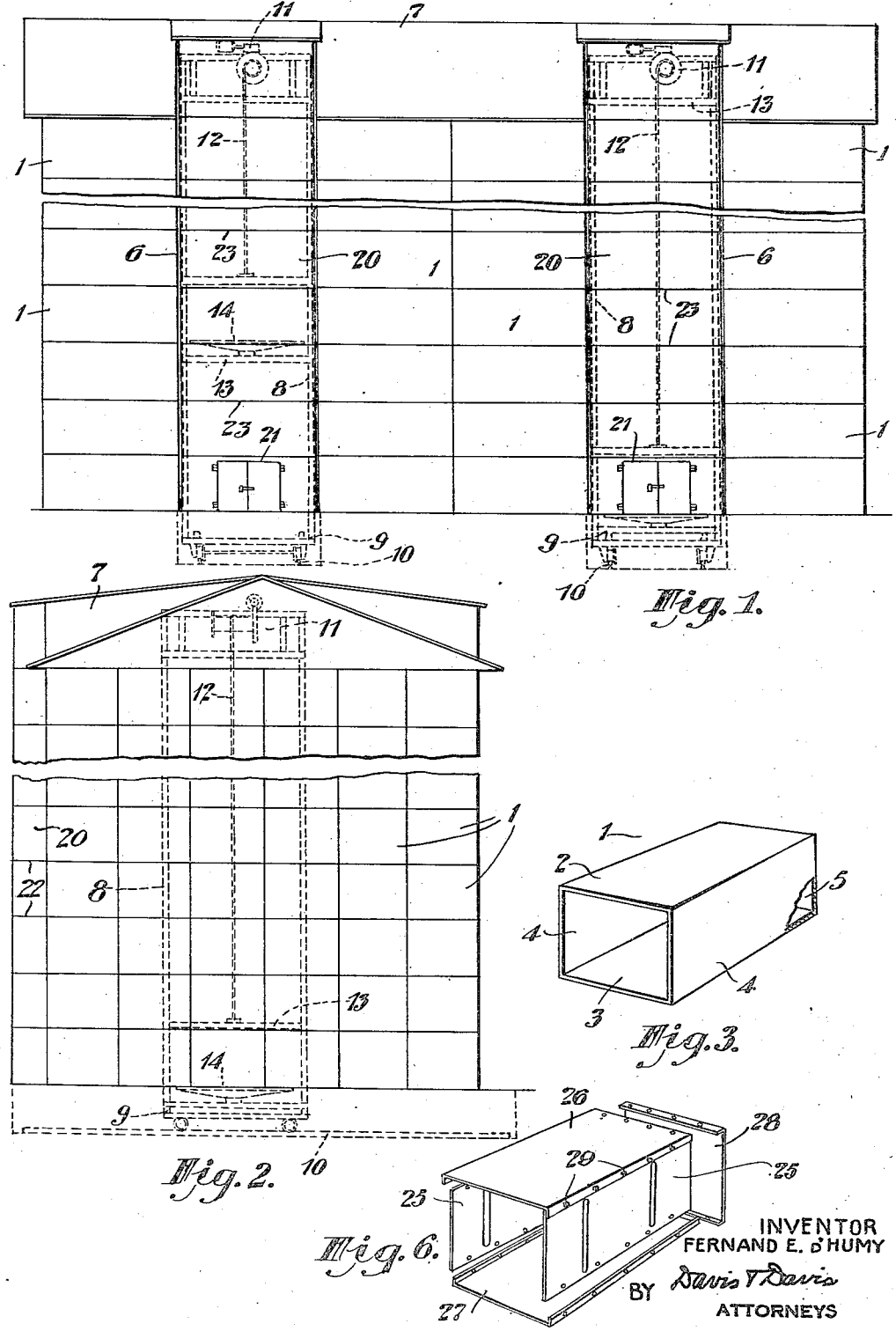

Nov. 8, 1932.   F. E. D'HUMY   1,886,943
GARAGE
Filed March 21, 1930   2 Sheets-Sheet 2

INVENTOR
FERNAND E. D'HUMY
BY Davis & Davis
ATTORNEYS

Patented Nov. 8, 1932

1,886,943

UNITED STATES PATENT OFFICE

FERNAND E. D'HUMY, OF SCARSDALE, NEW YORK, ASSIGNOR TO RAMP BUILDINGS CORPORATION, OF NEW YORK, N. Y., A CORPORATION OF DELAWARE

GARAGE

Application filed March 21, 1930. Serial No. 437,817.

Important objects of the present invention are, to provide a built-up garage or storage structure formed of a number of separately formed casings disposed in superposed relation and each forming an automobile storage compartment; to provide an improved knock-down garage structure which may be readily built up, taken down and set up again upon another site; to provide a garage whose size and storage capacity may be readily varied according to the needs of its patronage; and, to provide suitable means for conveying the automobiles to and from the various compartments of the built up structure.

Figure 5:
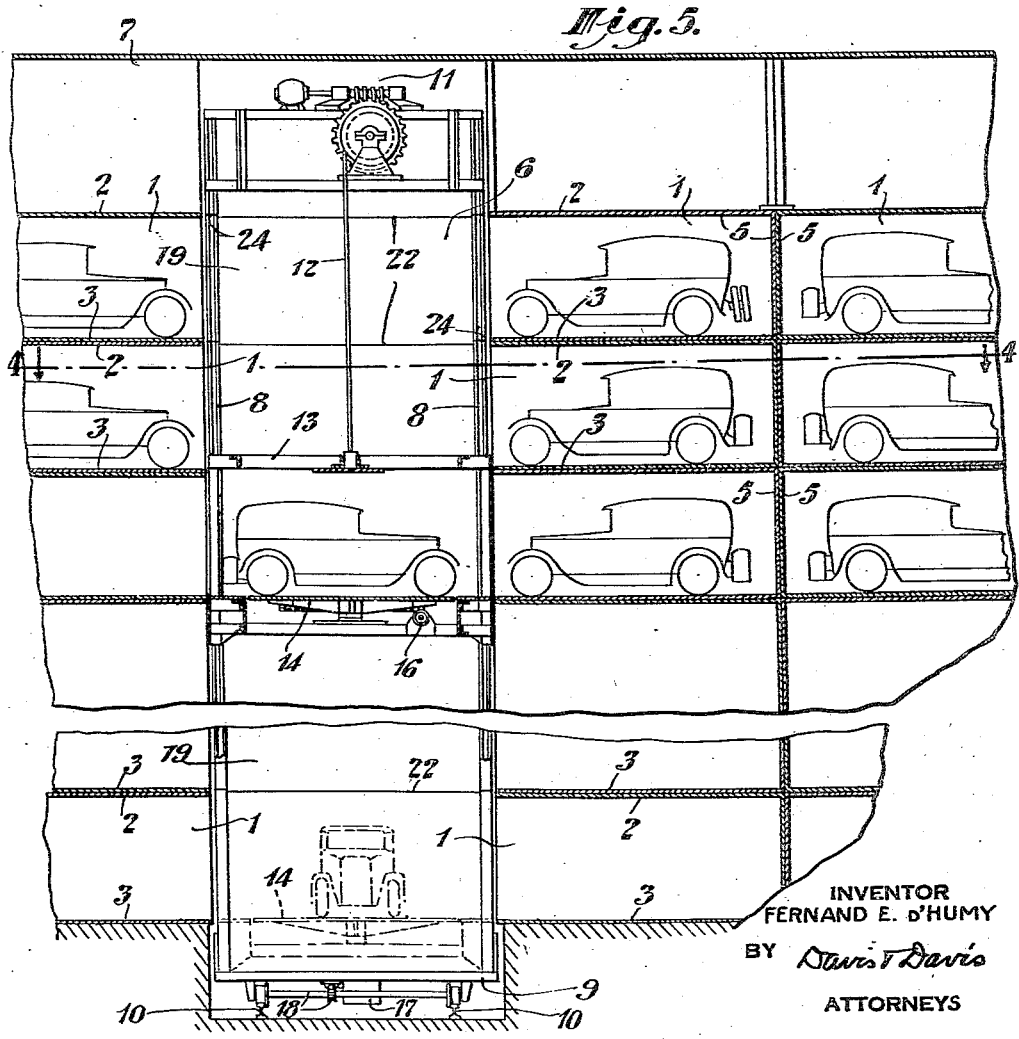

In the drawings:

Fig. 1 is a front view of my improved garage structure;

Fig. 2 a side view of the garage;

Fig. 3 a perspective view of one of the individual storage compartments;

Fig. 4 a horizontal section taken on the line 4—4 of Fig. 5;

Fig. 5 a vertical section taken on the line 5—5 of Fig. 4; and

Fig. 6 a perspective view of a sectional storage compartment partly assembled.

The garage structure is formed mainly by a large number of separately formed casings or cabinets 1. The casings form storage compartments for the automobiles and they are arranged and built up in superposed relation so as to form the body of the garage including the outer walls thereof. A cellular body structure is produced by the built up casings and the various cells or compartments are accessible from within the garage for the storage and removal of the automobiles.

Each casing 1 is a strong, rigid, box-like structure preferably formed of metal and provided with top and bottom walls 2 and 3, side walls 4 and one end wall 5. The opposite end of the casing is left open to provide a doorway for the automobiles. In the present instance the walls of the casing are shown as closed but they may be provided, if required, with openings for light or ventilation. The casings are preferably all of the same shape and size and each is proportioned to accommodate an automobile and provide sufficient clearance around it.

In the erected garage the casings are arranged and built up in superposed relation to form groups which extend in straight parallel lines and, in the present instance, are spaced so as to define two parallel corridor spaces 6. The open ends of the casings all open directly into these spaces. Between the corridor spaces there are two groups of casings whose closed ends are disposed back to back. In each group along the corridors the casings are removably disposed, one directly above the other, in vertical tiers disposed close together in succession along the corridors. In each tier the casings rest directly one upon another in succession, the lower casings entirely supporting the upper ones. It will be understood that the floor plan and the build up of the casings may be varied.

In the built up structure certain of the closed walls 4 and 5 of the outermost casings 1 are outwardly exposed and flush and form the front, back and side walls of the building. A suitable roof structure 7 covers all of the groups and is supported upon the uppermost casings.

For conveying the automobiles to and from the various compartments I have provided mechanical conveyor means. In the present instance this means is in the form of an elevator which travels both vertically and laterally. Disposed within each corridor 6 is a skeleton elevator shaft 8 provided with a wheeled truck 9 at its lower end. This truck travels upon a depressed track 10 which extends the length of the corridor. A motor driven hoisting apparatus 11 is supported by the upper end of the shaft 8 and suspended from the cable 12 thereof is the elevator cage 13 which is guided for vertical movement in the shaft. The corridor and the elevator structure are sufficiently wide to amply accommodate an automobile disposed crosswise of the corridor, and the elevator cage is provided with a turntable 14 for supporting the automobile. It is also provided with an electric motor 15 which has an operative connection 16 with the turntable for rotating it. The truck 9 of the elevator shaft is also provided with an electric motor 17 and transmission 18 for propelling the truck and supported elevator shaft back and forth along the corridor. This mechanical conveyor means may of course be varied.

It will be clear that in order to deliver an automobile to its assigned compartment the elevator shaft is driven to one end of the corridor to receive the automobile which is then driven upon the turntable 14. Next, the elevator shaft is driven along the corridor to the tier of casings containing the assigned storage compartments, the elevator cage is hoisted into register with said compartment, the turntable is rotated to dispose the automobile transversely of the corridor, and the automobile is driven directly into the compartment. In removing an automobile this procedure is reversed.

When this garage structure is used in a warm climate it is entirely practicable to leave the ends of the corridors 6 open. However, I have provided closure means to be employed in colder climates. At the rear of the building are closure wall structures 19, preferably formed of metal, which extend the width and height of the corridors, are secured in any suitable manner to the adjacent casings and are extended outward to provide clearance for the elevator shafts when the latter are at the rear ends of the corridors. For closing the front ends of the corridors I mount a metal shield 20 upon each elevator shaft. This shield covers the front and a portion of the sides of the shaft and when the shaft is at the front end of the corridor the latter is closed by the shield. At the ground level the shield is formed with a doorway 21 to give access to the elevator cage.

In addition to their closure functions the shields 20 serve as a ventilating means. In their movements back and forth with the elevator shafts they expel bad air from the interior of the garage and draw in fresh air.

The rear closure walls 19 and the shields 20 may be made of separable sections as indicated at 22 and 23 respectively. Also, the elevator shafts may be made in separable sections, as indicated at 24, joined together in any suitable manner. Then said walls, shields and elevator shafts may be built up to correspond with the height of the built up casings.

It will be seen that I have provided a very advantageous set-up and take-down garage structure. The storage units or casings will be made preferably in a standard form and size and they may be ordered from a manufacturer in the number required. Without extensive excavation or other preparation they may be set up on a vacant lot or field. The erection may be only tentative and the proprietor may at first install only a modest number of casings. Upon an increase of patronage beyond the capacity of the garage the proprietor may easily add more casings and generally build up the structure. If on the other hand, the location of the garage should prove to be a bad one or he should be required to vacate the land the garage may be readily knocked down and transferred to another location.

In Fig. 6 I have illustrated one manner of forming the individual storage compartments. The compartment here shown is formed of a number of separately fabricated sections or panels, preferably made of sheet metal suitably reinforced and including side panels 25, a top panel 26, a bottom panel 27 and an end panel 28. These panels may be releasably secured together, as indicated at 29, by bolts or other suitable means to form a strong self-supporting structure capable of also supporting other compartments and their contents resting upon it. Such a compartment may be shipped in a compact collapsed state and assembled conveniently at the place which it is to occupy in the cellular garage structure just described. It may also be readily taken apart when it is required to take down the garage.

What I claim is:

1. A self-supporting knockdown garage structure comprising opposed laterally spaced banks of compartments each of a size to accommodate an automobile, the banks defining a corridor space therebetween, the compartments of the banks having constantly open inner entrance ends opening into the corridor space and each bank comprising superposed horizontal rows of the compartments, and each compartment formed independently of a set of previously fabricated panels shaped and assembled to define the top, bottom, sides and one end wall thereof, the bottom panels forming the floors of the building and the end panels and outermost side-forming panels forming the outer side walls of the building; joining means detachably holding the panels of each compartment erected, the lower rows of compartments supporting the weight of the upper rows of compartments and their contents; and a roof supported by the banks, and covering the corridor space.

2. A self-supporting cellular garage structure comprising opposed, laterally spaced banks of compartments each adapted to accommodate an automobile, the banks defining a corridor space therebetween, the compartments of the banks having inner entrance ends opening into the corridor space and each bank comprising superposed horizontal rows of the compartments and each compartment being formed independently of a set of fabricated panels shaped and assembled to define the top, bottom, sides and one end wall thereof, the bottom panels forming the floors of the building and the end panels and outermost side-forming panels forming the outer side walls of the building; joining means holding the panels of each compartment erected, the lower rows of compartments supporting the upper rows of compartments and their contents; and a roof supported by the garage structure.

3. A self-supporting garage structure comprising opposed, laterally spaced banks of compartments each adapted to accommodate an automobile, the banks defining a corridor space therebetween, the compartments of the banks having inner entrance ends opening into the corridor space and each bank comprising superposed horizontal rows of the compartments and each compartment being formed of panels shaped and assembled to define the top, bottom, sides and one end wall thereof, the bottom panels forming the floors of the building and the end panels and outermost side-forming panels forming the outer side walls of the building; joining means holding the panels erected, the lower rows of compartments supporting the upper rows of compartments and their contents; and a roof supported by the garage structure.

4. A self-supporting garage structure comprising opposed, laterally spaced banks of compartments each adapted to accommodate an automobile, the banks defining a corridor space therebetween, the compartments of the banks having inner entrance ends opening into the corridor space and each bank comprising superposed horizontal rows of the compartments and each compartment being formed of panels shaped and assembled to define the top, bottom, sides and one end wall thereof, the bottom panels forming the floors of the building; joining means holding the panels erected, the lower rows of compartments supporting the weight of the upper rows of compartments and their contents; and a roof supported by the garage structure and covering the corridor space.

5. A self-supporting garage structure comprising opposed, laterally spaced banks of compartments each adapted to accommodate an automobile, the banks defining a corridor space therebetween, the compartments of the banks having inner entrance ends opening into the corridor space and each bank comprising superposed horizontal rows of the compartments and each compartment being formed of panels shaped and assembled to define the top, bottom, sides and one end wall thereof, the bottom panels forming the floors of the building; joining means holding the panels erected, the lower rows of compartments supporting the weight of the upper rows of compartments and their contents; and a roof structure extending over the top of the cellular structure and supported thereon.

6. A self-supporting cellular garage structure comprising opposed, laterally spaced banks of compartments each adapted to accommodate an automobile, the banks defining a corridor space therebetween, the compartments of the banks having inner entrance ends opening into the corridor space and each bank comprising superposed horizontal rows of the compartments and each compartment being formed independently of a set of fabricated panels shaped and assembled to define the top, bottom, sides and one end wall thereof, the bottom panels forming the floors of the building and the end panels and outermost side-forming panels forming the outer side walls of the building, the top panels reinforcing the floor-forming panels and all of the inner vertical walls of the structure formed by the contacting ends and side walls of the compartments being of double thickness, the lower rows of compartments supporting the upper rows of compartments and their contents; and joining means holding the panels of each compartment erected.

In testimony whereof I hereunto affix my signature.

FERNAND E. d'HUMY.